(12) United States Patent
Sakakibara et al.

(10) Patent No.: US 7,112,619 B2
(45) Date of Patent: Sep. 26, 2006

(54) WATER-BASED INK

(75) Inventors: Makoto Sakakibara, Wakayama (JP);
Nobushige Tanaka, Wakayama (JP);
Ryuma Mizushima, Wakayama (JP);
Kenji Kaida, Tokyo (JP); Takehiro Tsutsumi, Wakayama (JP)

(73) Assignee: Kao Corporation, Tokyo (JP)

( * ) Notice: Subject to any disclaimer, the term of this patent is extended or adjusted under 35 U.S.C. 154(b) by 279 days.

(21) Appl. No.: 10/740,664

(22) Filed: Dec. 22, 2003

(65) Prior Publication Data
US 2004/0132942 A1 Jul. 8, 2004

(30) Foreign Application Priority Data
Dec. 27, 2002 (JP) ............................. 2002-382310

(51) Int. Cl.
*C09D 11/10* (2006.01)
(52) U.S. Cl. .................. 523/161; 523/160; 524/556; 524/570
(58) Field of Classification Search ............... 523/160, 523/161; 524/556, 570
See application file for complete search history.

(56) References Cited

U.S. PATENT DOCUMENTS 5,714,538 A * 2/1998 Beach et al. ................ 524/504
5,852,074 A * 12/1998 Tsutsumi et al. ............ 523/161

2002/0132878 A1 9/2002 Latunski et al.

FOREIGN PATENT DOCUMENTS

| | | |
|---|---|---|
| EP | 1 059 341 | 12/2000 |
| EP | 1 113 051 | 7/2001 |
| EP | 1 158 030 | 11/2001 |
| EP | 1158030 A2 * | 11/2001 |
| EP | 1 321 496 | 6/2003 |
| JP | 60-250012 | 12/1985 |
| JP | 8-3500 | 1/1996 |
| JP | 8003500 | 1/1996 |
| JP | 11-12511 | 1/1999 |
| JP | 2002-338783 | 11/2002 |

* cited by examiner

*Primary Examiner*—David W. Wu
*Assistant Examiner*—Satya B. Sastri
(74) *Attorney, Agent, or Firm*—Oblon, Spivak, McClelland, Maier & Neustadt, P.C.

(57) ABSTRACT

A water-based ink containing an aqueous dispersion of water-insoluble vinyl polymer particles containing a pigment, wherein the water-insoluble vinyl polymer is prepared by copolymerizing a monomer mixture containing (a) a monomer having a salt-forming group, (b) a monomer having a long-chain alkyl group, (c) a macromer, (d) a monomer having a polyoxyalkylene group, and (e) a monomer copolymerizable with the monomer having a salt-forming group (a), the monomer having a long-chain alkyl group (b), the macromer (c) and the monomer having a polyoxyalkylene group (d). The water-based ink can be suitably used, for instance, as a water-based ink for inkjet recording and the like.

19 Claims, No Drawings

WATER-BASED INK

FIELD OF THE INVENTION

The present invention relates to a water-based ink. More specifically, the present invention relates to a water-based ink which can be suitably used, for instance, as a water-based ink for inkjet recording and the like.

BACKGROUND OF THE INVENTION

Inkjet recording is a recording system for forming characters or images, comprising directly jetting ink droplets from very fine nozzles to a recording medium, and depositing the ink droplets on the recording medium. This system has some advantages such that not only does the device show excellent operability at a low level of noise, but also the coloration is facilitated and a plain sheet of paper can be used as a recording medium. Therefore, this system has been recently widely used. Especially, the inkjet recording system has advantages in full-color recording techniques such that vivid images having high chroma can be obtained as compared to other recording systems when dyes rich in color tones are used.

Since light-fastness, water resistance and the like are required for an ink used for an inkjet printer, a pigment dispersion has been recently used as a colorant.

In a pigment dispersion which has been used as a writing utensil or general ink, a polymer dispersant, a surfactant or the like has been used. However, when this pigment dispersion is used for a water-based ink for inkjet recording, optical density of a printout is unsatisfactory, and jetting ability or the like of the ink droplet is unsatisfactory.

In order to eliminate this advantage, there has been proposed an ink containing an anionic polymer dispersant made of a copolymer having an aromatic ring, a carboxylate and a long-chain alkyl carboxylate group, an aqueous medium and a pigment as disclosed in Japanese Patent Gazette No. 3056664.

However, there are some advantages in this ink such that storage stability of the ink and water resistance of the printout are unsatisfactory.

SUMMARY OF THE INVENTION

The present invention relates to a water-based ink containing an aqueous dispersion of water-insoluble vinyl polymer (hereinafter simply referred to as "vinyl polymer") particles containing a pigment, wherein the vinyl polymer is prepared by copolymerizing a monomer mixture containing:
(i) a monomer having a salt-forming group (a),
(ii) a monomer having a long-chain alkyl group (b) having 16 to 30 carbon atoms,
(iii) a macromer (c),
(iv) a monomer having a polyoxyalkylene group (d), and
(v) a monomer (e) copolymerizable with the monomer having a salt-forming group (a), the monomer having a long-chain alkyl group (b), the macromer (c) and the monomer having a polyoxyalkylene group (d). This monomer mixture will be hereinafter simply referred to as a "monomer mixture."

DETAILED DESCRIPTION OF THE INVENTION

The present invention relates to a water-based ink for inkjet recording which is excellent in, for instance, storage stability and water resistance.

These and other advantages of the present invention will be apparent from the following description.

The monomer having a salt-forming group (a) includes cationic monomers, anionic monomers and the like. Examples of the monomer having a salt-forming group include those listed in page 5, column 7, line 24 to column 8, line 29 of Japanese Patent Laid-Open No. 9-286939 and the like.

Representative examples of the cationic monomer include unsaturated tertiary amine monomers, unsaturated ammonium salt monomers and the like. Among the cationic monomers, N-(N',N'-dimethylaminopropyl) (meth)acrylamide is preferable.

The term "(meth)acryl" as referred to herein means "acryl" or "methacryl."

Representative examples of the anionic monomer include unsaturated carboxylic acid monomers, unsaturated sulfonic acid monomers, unsaturated phosphoric acid monomers and the like. Among the anionic monomers, unsaturated carboxylic acid monomers such as methacrylic acid are preferable.

The content of the monomer having a salt-forming group (a) in the monomer mixture is preferably 1 to 50% by weight, more preferably 2 to 40% by weight, even more preferably 5 to 20% by weight from the viewpoint of dispersion stability of the aqueous dispersion of vinyl polymer particles.

In the monomer having a long-chain alkyl group (b), the long-chain alkyl group has 16 to 30 carbon atoms, preferably 18 to 30 carbon atoms, more preferably 18 to 22 carbon atoms from the viewpoint of availability of the monomer. Representative examples of the monomer having a long-chain alkyl group (b) include a monomer represented by the formula (I):

$$CH_2=C(R^1)COOR^2 \qquad (I)$$

wherein $R^1$ is hydrogen atom or a lower alkyl group having 1 to 4 carbon atoms, and $R^2$ is a monovalent hydrocarbon group having 16 to 30 carbon atoms, preferably 18 to 30 carbon atoms, more preferably 18 to 22 carbon atoms, which may have a hetero atom.

Representative examples of the monomer having a long-chain alkyl group (b) include (meth)acrylates such as (iso)cetyl (meth)acrylate, (iso)stearyl (meth)acrylate, (iso)behenyl (meth)acrylate and the like. Those monomers having a long-chain alkyl group can be used alone or in admixture of at least two kinds. The monomer having a long-chain alkyl group is preferable, from the viewpoints of suppressing the change in viscosity of the water-based ink by a wetting agent or a dispersant added in the preparation of the water-based ink, and sufficiently increasing the storage stability. In this case, the total content of stearyl (meth)acrylate and behenyl (meth)acrylate in the monomer mixture is preferably 10 to 70% by weight, more preferably 20 to 60% by weight, from the viewpoints of suppressing the change in viscosity of the water-based ink and sufficiently increasing the storage stability.

The expression "(iso)" as used herein means "iso" or "normal."

The content of the monomer having a long-chain alkyl group (b) in the monomer mixture is preferably 10 to 70% by weight, more preferably 20 to 60% by weight, even more preferably 30 to 50% by weight, from the viewpoint of the storage stability of the aqueous dispersion of the vinyl polymer particles.

The macromer (c) includes those macromer having a polymerizable functional group at one end and a number-average molecular weight of preferably 500 to 100000, more preferably 2000 to 100000, even more preferably 4000 to 100000.

Representative examples of the macromer include styrenic macromers having a polymerizable functional group at one end, silicone macromers having a polymerizable functional group at one end, alkyl methacrylate macromers having a polymerizable functional group at one end, styrene-acrylonitrile macromers having a polymerizable functional group at one end and the like. Preferable macromers include styrenic macromers having a polymerizable functional group at one end and silicone macromers having a polymerizable functional group at one end. In some cases, the expression "having a polymerizable functional group at one end" may be hereinafter omitted in these macromers.

The number-average molecular weight of the macromer (c) is determined by gel permeation chromatography using polystyrene as a standard substance, and tetrahydrofuran containing 50 mmol/L acetic acid as a solvent.

Among the macromers (c), the styrenic macromer is more preferable from the viewpoint of sufficiently including the pigment in the vinyl polymer.

The styrenic macromer having a polymerizable functional group at one end includes a styrene homopolymer having a polymerizable functional group at one end, and a copolymer of styrene and other monomer, having a polymerizable functional group at one end. Among them, styrenic macromers having (meth)acryloyloxy group as a polymerizable functional group at one end are more preferable. The styrenic macromer is more preferably a styrene homopolymerized macromer having (meth)acryloyloxy group at one end. In the copolymer of styrene and other monomer, having a polymerizable functional group at one end, the other monomer includes, for instance, acrylonitrile and the like. The content of the styrenic macromer in the monomer mixture is preferably 5 to 50% by weight, more preferably 10 to 30% by weight from the viewpoint of sufficiently including the pigment in the vinyl polymer.

The content of the component (c) in the monomer mixture is preferably 5 to 50% by weight, more preferably 10 to 30% by weight from the viewpoint of sufficiently including the pigment in the vinyl polymer.

Representative examples of the monomer having a polyoxyalkylene group (d) is a monomer represented by the formula (II):

$$CH_2=C(R^1)COO(R^3O)_pR^4 \quad\quad (II)$$

wherein $R^1$ is hydrogen atom or a lower alkyl group, $R^3$ is a divalent hydrocarbon group having 1 to 30 carbon atoms which may have a hetero atom; $R^4$ is hydrogen atom or a monovalent hydrocarbon group having 1 to 30 carbon atoms which may have a hetero atom, and p is a number of 1 to 60. This monomer increases jetting stability of the water-based ink of the present invention.

In the formula (II), $R^1$ is hydrogen atom or a lower alkyl group. The lower alkyl group includes an alkyl group having 1 to 4 carbon atoms.

$R^3$ is a divalent hydrocarbon group having 1 to 30 carbon atoms which may have a hetero atom. The hetero atom includes, for instance, nitrogen atom, oxygen atom, a halogen atom and sulfur atom.

Representative examples of $R^3$ include an aromatic ring having 6 to 30 carbon atoms, which may have a substituent; a hetero ring having 3 to 30 carbon atoms, which may have a substituent; an alkylene group having 1 to 30 carbon atoms which may have a substituent; and the like. These rings or groups may be used in combination of at least two kinds. The substituent includes an aromatic ring having 6 to 29 carbon atoms, a hetero ring having 3 to 29 carbon atoms, an alkyl group having 1 to 29 carbon atoms, a halogen atom, amino group and the like.

Preferred examples of $R^3$ include a phenylene ring having 1 to 24 carbon atoms, which may have a substituent, an aliphatic alkylene group having 1 to 30 carbon atoms, preferably 1 to 20 carbon atoms, an alkylene group of 7 to 30 carbon atoms having an aromatic ring and an alkylene group of 4 to 30 carbon atoms having a hetero ring.

Preferred examples of an $R^3O$ group include an alkylene oxide group having 2 to 7 carbon atoms, such as ethylene oxide group, (iso)propylene oxide group, tetramethylene oxide group, heptamethylene oxide group, hexamethylene oxide group, and combination thereof, and phenylene oxide group.

$R^4$ is hydrogen atom or a monovalent hydrocarbon group having 1 to 30 carbon atoms which may have a hetero atom. The hetero atom includes, for instance, nitrogen atom, oxygen atom and sulfur atom.

Representative examples of $R^4$ include hydrogen atom; an aromatic ring having 6 to 30 carbon atoms, which may have a substituent; a hetero ring having 3 to 30 carbon atoms, which may have a substituent; and an alkyl group having 1 to 30 carbon atoms which may have a substituent. The substituent includes an aromatic ring having 6 to 29 carbon atoms, a hetero ring having 4 to 29 carbon atoms, a halogen atom, amino group and the like.

Preferred examples of $R^4$ include hydrogen atom, or phenyl group, an aliphatic alkyl group having 1 to 30 carbon atoms, preferably 1 to 20 carbon atoms, an alkyl group of 7 to 30 carbon atoms having an aromatic ring and an alkyl group of 4 to 30 carbon atoms having a hetero ring.

More preferred examples of $R^4$ include hydrogen atom, an alkyl group having 1 to 6 carbon atoms, such as methyl group, ethyl group, (iso)propyl group, (iso)butyl group, (iso)pentyl group, (iso)hexyl group and phenyl group.

p is a number of 1 to 60, preferably a number of 1 to 30, more preferably a number of 3 to 10.

Representative examples of the monomer represented by the formula (II) include polyethylene glycol (2–30 which shows the p value in the formula (II), hereinafter referred to the same) (meth)acrylates, poly(ethylene glycol (1–15).propylene glycol (1–15) (meth)acrylates, polypropylene glycol (2–30) (meth)acrylates, methoxypolyethylene glycol(1–30) (meth)acrylates, methoxypolytetramethylene glycol (1–30) (meth)acrylates, ethoxypolyethylene glycol (1–30) (meth) acrylates, (iso)propoxypolyethylene glycol (1–30) (meth) acrylates, butoxypolyethylene glycol (1–30) (meth)acrylates, methoxypolypropylene glycol (1–30) (meth)acrylates, methoxy(ethylene glycol-propylene glycol copolymer) (1–30, out of which ethylene glycol: 1–29) (meth)acrylates and the like. Those monomers can be used alone or in admixture of at least two kinds.

Among the monomers represented by the formula (II), polyethylene glycol (2–30) (meth)acrylates and/or polypropylene glycol (2–30) (meth)acrylates are preferable. The total content of polyethylene glycol (2–30) (meth)acrylates and polypropylene glycol (2–30) (meth)acrylates in the monomer mixture is preferably 5 to 50% by weight, more preferably 10 to 40% by weight, from the viewpoints of increasing the jetting stability of the water-based ink.

The content of the monomer having a polyoxyalkylene group (d) in the monomer mixture is preferably 5 to 50% by weight, more preferably 10 to 40% by weight, from the viewpoints of increasing the jetting stability of the water-based ink.

The monomer (e) copolymerizable with the monomer having a salt-forming group (a), the monomer having a long-chain alkyl group (b), the macromer (c) and the monomer having a polyoxyalkylene group (d) (hereinafter simply referred to as "copolymerizable monomer") includes (meth) acrylates such as methyl (meth)acrylate, ethyl (meth)acrylate, (iso)propyl (meth)acrylate, (iso or tertiary)butyl (meth) acrylate, 2-ethylhexyl (meth)acrylate, (iso)octyl (meth) acrylate, (iso)decyl (meth)acrylate, (iso)dodecyl (meth) acrylate, (iso)amyl (meth)acrylate, cyclohexyl (meth) acrylate, benzyl (meth)acrylate, 2-hydroxyethyl (meth) acrylate, 3-hydroxypropyl (meth)acrylate; styrenic monomers such as styrene, vinyltoluene, 2-methylstyrene and chlorostyrene; and the like. These monomers (e) can be used alone or in admixture of at least two kinds.

The expression "(iso or tertiary)" as used herein means "iso," "tertiary" or "normal."

It is preferable that the copolymerizable monomer contains a styrenic monomer from the viewpoint of increasing optical density. The preferred styrenic monomers include styrene, and those can be used alone or in admixture.

The content of the copolymerizable monomer in the monomer mixture is preferably 5 to 40% by weight, more preferably 5 to 30% by weight, from the viewpoint of increasing optical density.

The total content of the monomer having a salt-forming group (a) and the monomer having a polyoxyalkylene group (d) in the monomer mixture is preferably 6 to 75% by weight, more preferably 10 to 60% by weight, even more preferably 20 to 40% by weight, from the viewpoints of increasing dispersion stability and jetting stability of the aqueous dispersion of the vinyl polymer particles.

The vinyl polymer can be obtained by copolymerizing the monomer mixture by a known polymerization method such as a bulk polymerization method, a solution polymerization method, a suspension polymerization method or an emulsion polymerization method. Among these polymerization methods, the solution polymerization method is preferable.

The solvent used in the solution polymerization method is preferably a polar organic solvent. When the polar organic solvent is a water-miscible organic solvent, the water-miscible organic solvent and water can be also used as a mixture.

The organic solvent includes, for instance, aliphatic alcohols having 1 to 3 carbon atoms, such as methanol, ethanol and propanol; ketones such as acetone, methyl ethyl ketone and methyl isobutyl ketone; esters such as ethyl acetate; and the like. Among them, methanol, ethanol, acetone, methyl ethyl ketone or a mixed solvent of at least one of those solvents and water is preferable.

A radical polymerization initiator can be used in the polymerization. Preferable radical polymerization initiators include azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis (1-cyclohexanecarbonitrile). Also, organic peroxides such as t-butyl peroxyoctoate, di-t-butyl peroxide and dibenzoyl oxide can be used as radical polymerization initiators.

The amount of the polymerization initiator to the monomer mixture is preferably 0.001 to 5% by mol, more preferably 0.01 to 2% by mol.

In the polymerization, a polymerization chain transfer agent can be used. Representative examples of the polymerization chain transfer agent include mercaptans such as octyl mercaptan, n-dodecyl mercaptan, t-dodecyl mercaptan, n-tetradecyl mercaptan and 2-mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those polymerization chain transfer agents can be used alone or in admixture of at least two kinds.

The conditions for polymerizing the monomer composition cannot be absolutely determined because the conditions differ depending upon the type of radical polymerization initiator, the monomers, the solvent used, and the like. The polymerization temperature is usually preferably 30° to 100° C., more preferably 50° to 80° C., and the polymerization time is preferably 1 to 20 hours. It is preferable that the atmosphere for polymerization is an atmosphere of an inert gas such as a nitrogen gas.

After the termination of the polymerization reaction, the vinyl polymer can be isolated from the reaction solution by a known method such as re-precipitation or solvent distillation. The resulting vinyl polymer can be purified by removing unreacted monomers and the like from the vinyl polymer by the repeat of re-precipitation, membrane separation, a chromatographic method, an extraction method or the like.

The weight-average molecular weight of the vinyl polymer is preferably 3000 to 200000, more preferably 5000 to 100000, as determined by the method described in Preparation Examples 1 and 2 set forth below, from the viewpoints of jetting ability, prevention of scorching of the printer head, durability of the ink after printing and the dispersion stability.

The pigment can be any of an inorganic pigment and an organic pigment. The pigment can be used together with an extender pigment as occasion demands.

The inorganic pigment includes, for instance, carbon black, metal oxides, metal sulfides, metal chlorides and the like. Among them, carbon black is preferable for a black water-based ink. The carbon black includes furnace black, thermal lamp black, acetylene black, channel black and the like.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The extender pigment includes silica, calcium carbonate, talc and the like.

The amount of the pigment is preferably 20 to 400 parts by weight, more preferably 50 to 300 parts by weight based on 100 parts by weight of the solid content of the vinyl polymer from the viewpoints of optical density and facilitation in incorporating the pigment into the vinyl polymer particles.

The aqueous dispersion of the vinyl polymer particles containing a pigment can be obtained by a process comprising dissolving the vinyl polymer in a polar organic solvent, adding the pigment to the solution obtained, pre-kneading the mixture, adding water and a neutralizing agent to the mixture and kneading the resulting mixture, to give an oil-in water dispersion, and distilling off the organic solvent from the resulting kneaded mixture to give the aqueous dispersion.

The term "organic solvent" as referred to herein is an organic solvent having a boiling point of less than 130° C. at 101 kPa. Among them, alcoholic solvents, ketone solvents and ether solvents are preferable, and hydrophilic organic solvents are more preferable.

The alcoholic solvent includes, for instance, methanol, ethanol, isopropanol, n-butanol, tertiary butanol, isobutanol, diacetone alcohol and the like. The ketone solvent includes, for instance, acetone, methyl ethyl ketone, diethyl ketone, methyl isobutyl ketone and the like. The ether solvent includes dibutyl ether, tetrahydrofuran, dioxane and the like. Among these solvents, isopropanol, acetone and methyl ethyl ketone are preferable. Also, the above-mentioned organic solvent and a hydrophilic organic solvent having a high boiling point can be used together as occasion demands.

The term "hydrophilic organic solvent having a high boiling point" as referred to herein is a hydrophilic organic solvent having a boiling point of at least 130° C. at 101 kPa. Examples of the hydrophilic organic solvent include phenoxyethanol, ethylene glycol monomethyl ether, diethylene glycol monomethyl ether, diethylene glycol monoethyl ether, diethylene glycol diethyl ether, and the like.

As the neutralizing agent, an acid or a base can be used depending upon the kind of the salt-forming group of the polymer. The acid includes, for instance, inorganic acids such as hydrochloric acid and sulfuric acid; and organic acids such as acetic acid, propionic acid, lactic acid, succinic acid, glycollic acid, gluconic acid and glyceric acid. The base includes, for instance, tertiary amines such as trimethylamine and triethylamine, ammonia, sodium hydroxide, potassium hydroxide and the like.

The neutralization degree is not limited to specified ones. It is preferable that the resulting aqueous dispersion is usually around neutrality. For instance, the pH of the aqueous dispersion is 4.5 to 9.

The average particle diameter of the vinyl polymer particles containing a pigment is preferably 0.01 to 0.5 μm, more preferably 0.02 to 0.2 μm from the viewpoints of prevention of clogging of nozzles and dispersion stability.

The content of the vinyl polymer particles containing a pigment in the aqueous dispersion (concentration of solid content) is preferably 1 to 50% by weight, more preferably 5 to 30% by weight from the viewpoints of optical density of the printouts and storage stability of the aqueous dispersion.

It is desired that the amount of the aqueous dispersion in the water-based ink is usually controlled so that the content of the vinyl polymer particles in the water-based ink becomes preferably 1 to 30% by weight, more preferably 2 to 15% by weight from the viewpoints of optical density and jetting stability.

To the water-based ink for inkjet recording of the present invention, additives such as a wetting agent, a dispersant, a defoaming agent, a mildewproof agent and a chelating agent can be added as occasion demands.

The wetting agent includes, for instance, polyhydric alcohols or ethers thereof, such as ethylene glycol, propylene glycol, diethylene glycol, triethylene glycol, polyethylene glycol, glycerol, diethylene glycol diethyl ether and diethylene glycol mono-n-butyl ether; acetates; nitrogen-containing compounds such as N-methyl-2-pyrrolidone and 1,3-dimethylimidazolidinone; and the like. The amount of the wetting agent in the water-based ink is preferably 0.1 to 50% by weight, more preferably 0.1 to 30% by weight.

The dispersant includes anionic, nonionic, cationic and amphoteric surfactants. The amount of the dispersant in the water-based ink is preferably 0.1 to 50% by weight, more preferably 1 to 20% by weight.

Representative examples of the defoaming agent include a compound represented by the formula (III):

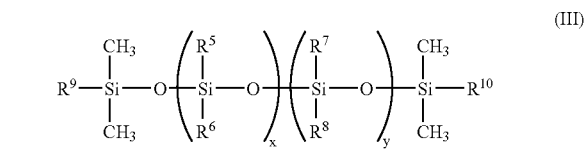

wherein each of $R^5$, $R^6$, $R^7$ and $R^8$ is independently an alkyl group having 1 to 10 carbon atoms or a phenyl group which may have a substituent; each of $R^9$ and $R^{10}$ is independently an alkyl group having 1 to 10 carbon atoms, a phenyl group which may have a substituent, hydroxyl group, amino group, carboxyl group or epoxy group; each of x and y is independently a number of 0 to 1000, preferably 10 to 100. This compound is preferable from the viewpoints of suppression of the generation of bubbles in the preparation of the water-based ink and adjustment of the surface tension of the water-based ink.

The amount of the defoaming agent in the water-based ink is preferably 0.001 to 2% by weight, more preferably 0.005 to 0.5% by weight, from the viewpoints of suppression of the generation of bubbles and jetting stability. The content of water in the water-based ink is preferably 30 to 90% by weight, more preferably 50 to 80% by weight.

EXAMPLES

The following examples further describe and demonstrate embodiments of the present invention. The examples are given solely for the purposes of illustration and are not to be construed as limitations of the present invention.

Preparation Examples 1 and 2

A reaction vessel was charged with monomers and a polymerization chain transfer agent listed in the column of "initially charged monomers" of Table 1 and 24 parts by weight of methyl ethyl ketone. Thereafter, nitrogen gas replacement was sufficiently carried out to give a mixed solution.

On the other hand, a dropping funnel was charged with monomers and a polymerization chain transfer agent listed in the column of "dropping monomers" of Table 1, and 56 parts by weight of methyl ethyl ketone and 1.2 parts by weight of 2,2'-azobis(2,4-dimethylvaleronitrile). Thereafter, nitrogen gas replacement was sufficiently carried out to give a mixed solution.

The temperature of the mixed solution in the reaction vessel was raised to 75° C., with stirring the mixed solution, and the mixed solution in the dropping funnel was gradually added dropwise to the mixed solution in the reaction vessel over a period of 1 hour. After 2 hours passed from the end of the dropwise addition, a solution prepared by dissolving 1.2 parts by weight of 2,2'-azobis(2,4-dimethylvaleronitrile) in 12 parts by weight of methyl ethyl ketone was added dropwise to the mixed solution in the reaction vessel over a period of 3 hours. Thereafter, the resulting mixture was aged at 75° C. for 2 hours and then at 80° C. for 2 hours to give a copolymer solution.

A part of the resulting copolymer solution was dried under a reduced pressure at 105° C. for 2 hours, and the solvent was completely removed from the solution to isolate the copolymer. The weight-average molecular weight of the copolymer was determined by gel permeation chromatography using polystyrene as a standard substance, and tetrahydrofuran containing 50 mmol/L acetic acid as a solvent. As a result, the copolymers had weight-average molecular weights of about 20000.

The concentration of the resulting copolymer solution was adjusted to 50% with methyl ethyl ketone. Two parts by weight of a 5 mol/L aqueous sodium hydroxide was added to 15 parts by weight of this 50% copolymer solution to neutralize. Further, 7.5 parts by weight of Pigment Blue (15:3) (commercially available from DAINIPPON INK & CHEMICALS, INC. under the trade name of Fastogen Blue TGR-SD) was added thereto, and the mixture was kneaded with a roll-mill. The kneaded mixture was dispersed in 100 parts by weight of ion-exchanged water.

The organic solvent was completely removed from the resulting dispersion at 60° C. under a reduced pressure, and water was further removed therefrom to concentrate, to give an aqueous dispersion of vinyl polymer particles containing a pigment, the solid content of which was 20% by weight.

TABLE 1

| Prep. Ex. No. | Initially Charged Monomers (Parts by Weight) | Dropping Monomers (Parts by Weight) |
|---|---|---|
| 1 | Styrene [6]<br>Stearyl Methacrylate [11]<br>Styrenic Macromer [4]<br>Polypropylene Glycol(9) Methacrylate [5]<br>Methacrylic Acid [5]<br>2-Mercaptoethanol [0.05] | Styrene [14]<br>Stearyl Methacrylate [24]<br>Styrenic Macromer [9]<br>Polypropylene Glycol(9) Methacrylate [9]<br>Methacrylic Acid [10]<br>2-Mercaptoethanol [0.13] |
| 2 | Styrene [6]<br>Behenyl Methacrylate [11]<br>Styrenic Macromer [4]<br>Polypropylene Glycol(9) Methacrylate [5]<br>Methacrylic Acid [5]<br>2-Mercaptoethanol [0.05] | Styrene [14]<br>Behenyl Methacrylate [24]<br>Styrenic Macromer [9]<br>Polypropylene Glycol(9) Methacrylate [12]<br>Methacrylic Acid [10]<br>2-Mercaptoethanol [0.13] |

Each name listed in Table 1 means the followings:

Styrenic macromer: commercially available from TOAGOSEI CO., LTD. under the trade name of AS-6 (styrene homopolymerized macromer having a polymerizable functional group of methacryloyloxy group, number-average molecular weight: 6000)

Polypropylene glycol(9) methacrylate: commercially available from NOF Corporation under the trade name of Blemmer PP-500 (the number of moles of propylene oxide being added: 9).

Comparative Preparation Example 1

The same procedures as in Preparation Example 1 were carried out except that those listed in Table 2 were used as the initially charged monomers and the dropping monomers, and that the amount of 5 mol/L aqueous sodium hydroxide was changed to 4.2 parts by weight, to give an aqueous dispersion of vinyl polymer particles containing a pigment.

TABLE 2

| Comp. Prep. Ex. No. | Initially Charged Monomers (Parts by Weight) | Dropping Monomers (Parts by Weight) |
|---|---|---|
| 1 | Styrene [19.5]<br>Lauryl Acrylate [5]<br>Acrylic Acid [6]<br>2-Mercaptoethanol [0.045] | Styrene [45.5]<br>Lauryl Acrylate [10]<br>Acrylic Acid [14]<br>2-Mercaptoethanol [0.105] |

Examples 1 and 2

Forty parts by weight of the aqueous dispersion of vinyl polymer particles containing a pigment obtained in Preparation Examples 1 and 2, 14 parts by weight of glycerol, 0.9 parts by weight of triethanolamine, 0.8 parts by weight of acetylene glycol.polyethylene oxide adduct [commercially available from Air Products Japan, Inc. under the trade name of Surfynol 465], 8 parts by weight of triethylene glycol monobutyl ether and 36.3 parts by weight of ion-exchanged water were mixed together. The resulting mixture was filtered with a 25-mL needle-less syringe [commercially available from TERUMO CORPORATION] equipped with a filter having a pore diameter of 1.2 μm [acetyl cellulose membrane, outer diameter: 2.5 cm, commercially available from Fuji Photo Film Co., Ltd.], thereby removing coarse grains, to give water-based inks of Examples 1 and 2 corresponding to Preparation Examples 1 and 2, respectively.

Comparative Example 1

The same procedures as in Examples 1 and 2 were carried out except that the aqueous dispersion of vinyl polymer particles containing a pigment obtained in Comparative Preparation Example 1 was used, to give a water-based ink.

The physical properties of the water-based inks obtained in each of Examples 1 and 2 and Comparative Example 1 were evaluated in accordance with the following methods. The results are shown in Table 3.

(1) Storage Stability

The viscosity of an ink before and after the ink was allowed to stand with heating in a thermostat kept at 60° C. for 30 days was determined using E-type Viscometer commercially available from Toki Sangyo K.K. under the model number RE80, and evaluated on the basis of the following evaluation criteria.

[Evaluation Criteria]

○: An absolute value of the difference in viscosity of an ink before and after allowing the ink to stand with heating being less than 0.5 mPa·s Δ: An absolute value of the difference in viscosity of an ink before and after allowing the ink to stand with heating being at least 0.5 mPa·s and less than 2.0 mPa·s X: An absolute value of the difference in viscosity of an ink before and after allowing the ink to stand with heating being at least 2.0 mPa·s (2) Water Resistance Solid image printing was carried out on a plain copy paper commercially available from FUJI XEROX CO., LTD. under the trade name of Xerox 4024 using an inkjet printer commercially available from SEIKO EPSON CORPORATION under the model number of EM-930C. The printed image was dried at 25° C. for 1 hour to give a sample. Thereafter, the optical density of the specified printed portion of the obtained sample was determined by using a Macbeth densitometer commercially available from Macbeth Process Measurements Co. under the product number of RD914. The printed copy paper was immersed vertically in stand-still water for 10 seconds, and the paper was lifted vertically therefrom. After air-drying the paper at 25° C. for 24 hours, the optical density of the same printing portion as that before immersion was determined. The residual ratio of the optical density after immersion to the optical density before immersion was obtained by the following equation:

[Residual Ratio]=([Optical Density After Immersion]/[Optical Density Before Immersion])×100

[Evaluation Criteria]
⊚: Residual ratio being at least 95%
○: Residual ratio being at least 90% and less than 95%
Δ: Residual ratio being at least 70% and less than 90%
X: Residual ratio being less than 70%

TABLE 3

| | Physical Properties of Water-Based Ink | |
|---|---|---|
| Ex. No. | Storage Stability | Water Resistance |
| 1 | ○ | ⊚ |
| 2 | ○ | ⊚ |
| Comp. Ex. 1 | x | Δ |

It can be seen from the results shown in Table 3 that all of the water-based inks obtained in each Example are excellent in storage stability and water resistance.

The water-based ink of the present invention is excellent in storage stability and in water resistance. Therefore, the water-based ink of the present invention can be suitably used as a water-based ink for inkjet recording or the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water-based ink comprising an aqueous dispersion of water-insoluble vinyl polymer particles containing a pigment, wherein said water-insoluble vinyl polymer is prepared by copolymerizing a monomer mixture comprising: (a) a monomer having a salt-forming group, (b) 10–70 wt. % of a monomer having a long-chain alkyl group having 16 to 30 carbon atoms, (c) a macromer, (d) a monomer having a polyoxyalkylene group, and (e) a monomer copolymerizable with the monomer having a salt-forming group (a), the monomer having a long-chain alkyl group (b), the macromer (c) and the monomer having a polyoxyalkylene group (d).

2. The water-based ink according to claim 1, wherein the monomer having a long-chain alkyl group (b) is a monomer represented by the formula (I):

$$CH_2=C(R^1)COOR^2 \qquad (I)$$

wherein $R^1$ is hydrogen atom or a lower alkyl group, and $R^2$ is a monovalent hydrocarbon group having 16 to 30 carbon atoms which may have a hetero atom.

3. The water-based ink according to claim 1, wherein the macromer (c) is a styrenic macromer having a polymerizable functional group at one end.

4. The water-based ink according to claim 1, wherein the monomer having a polyoxyalkylene group (d) is a monomer represented by the formula (II):

$$CH^2=C(R^1)COO(R^3O)_pR^4 \qquad (II)$$

wherein $R^1$ is hydrogen atom or a lower alkyl group, $R^3$ is a divalent hydrocarbon group having 1 to 30 carbon atoms which may have a hetero atom; $R^4$ is hydrogen atom or a monovalent hydrocarbon group having 1 to 30 carbon atoms which may have a hetero atom, and p is a number of 1 to 60.

5. The water-based ink according to claim 1, wherein the water-insoluble vinyl polymer has a weight-average molecular weight of 3000 to 200000.

6. The water-based ink according to claim 1, wherein said salt-forming group monomer (a) is present in an amount from 1 to 50 wt. %.

7. The water-based ink according to claim 1, wherein said macromer (c) is present in an amount from 5 to 50 wt. %.

8. The water-based ink according to claim 1, wherein said monomer having a polyoxyalkylene group (d) is present in an amount from 5 to 50 wt. %.

9. The water-based ink according to claim 1, wherein a total content of said salt-forming group monomer (a) and said monomer having a polyoxyalkylene group (d) is 6 to 75 wt. %.

10. The water-based ink according to claim 1, wherein said monomer having a long-chain alkyl group having 16 to 30 carbon atoms, has 18 to 30 carbon atoms.

11. The water-based ink according to claim 1, wherein said monomer having a long-chain alkyl group having 16 to 30 carbon atoms, has 18 to 22 carbon atoms.

12. The water-based ink according to claim 1, wherein component (b) comprises stearyl (meth)acrylate and behenyl (meth)acrylate, wherein the total content of stearyl (meth) acrylate and behenyl (meth)acrylate in the monomer mixture is 10 to 70 wt. %.

13. The water-based ink according to claim 1, wherein component (b) comprises stearyl (meth)acrylate and behenyl (meth)acrylate, wherein the total content of stearyl (meth) acrylate and behenyl (meth)acrylate in the monomer mixture is 20 to 60 wt. %.

14. The water-based ink according to claim 1, wherein said macromer (c) has a polymerizable functional group at one end and a number average molecular weight of from 500 to 100,000.

15. The water-based ink according to claim 1, wherein said pigment is present in an amount of from 20 to 400 part by weight based on 1000 parts by weight of a solid content of said vinyl polymer.

16. The water-based ink according to claim 1, wherein an average particle diameter of said vinyl polymer particles is 0.01 to 0.5 μm.

17. The water-based ink according to claim 1, wherein a pH of said aqueous dispersion is from 4.5 to 9.

18. The water-based ink according to claim 1, wherein a content of said vinyl polymer particles containing a pigment is said aqueous dispersion is from 1 to 50 wt. %.

19. The water-based ink according to claim 1, further comprising a dispersant in an amount of 0.1 to 50 wt. %.

* * * * *